United States Patent
Inao et al.

(10) Patent No.: US 9,616,826 B2
(45) Date of Patent: Apr. 11, 2017

(54) WIRE HARNESS EXTERIOR MEMBER AND WIRE HARNESS

(71) Applicant: Yazaki Corporation, Tokyo (JP)

(72) Inventors: Shinichi Inao, Makinohara (JP);
Hideomi Adachi, Makinohara (JP);
Takeshi Ogue, Makinohara (JP);
Tatsuya Oga, Makinohara (JP);
Masaaki Suguro, Makinahara (JP);
Yoshiaki Ozaki, Makinohara (JP);
Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/589,299

(22) Filed: Jan. 5, 2015

(65) Prior Publication Data

US 2015/0107895 A1    Apr. 23, 2015

Related U.S. Application Data

(63) Continuation of application No. PCT/JP2013/070658, filed on Jul. 30, 2013.

(30) Foreign Application Priority Data

Aug. 1, 2012  (JP) ................. 2012-170834

(51) Int. Cl.
*B60R 16/02* (2006.01)
*H02G 3/06* (2006.01)
*H02G 3/32* (2006.01)

(52) U.S. Cl.
CPC ........... *B60R 16/0215* (2013.01); *H02G 3/06* (2013.01); *H02G 3/32* (2013.01)

(58) Field of Classification Search
CPC .................................................. B60R 16/0215
USPC ......................................................... 174/72 A
See application file for complete search history.

(56) References Cited

U.S. PATENT DOCUMENTS

| 1,817,772 | A | 8/1931 | Sipe |
| 6,398,170 | B1 | 6/2002 | Wada |
| 2004/0154817 | A1* | 8/2004 | Sudo ........................ H02G 3/06 174/481 |
| 2007/0187144 | A1 | 8/2007 | Kato |
| 2010/0164226 | A1* | 7/2010 | Serizawa .............. F16L 3/1091 285/149.1 |

(Continued)

FOREIGN PATENT DOCUMENTS

| CN | 102076528 A | 5/2011 |
| EP | 1022503 A1 | 7/2000 |

(Continued)

OTHER PUBLICATIONS

Translation of Written Opinion dated Sep. 17, 2013 issued by the International Searching Authority in counterpart International Patent Application No. PCT/JP2013/070658 (PCT/ISA/237).
Search Report dated Sep. 17, 2013 issued by the International Searching Authority in counterpart International Patent Application No. PCT/JP2013/070658 (PCT/ISA/210).

(Continued)

*Primary Examiner* — Hoa C Nguyen
*Assistant Examiner* — Stanley Tso
(74) *Attorney, Agent, or Firm* — Sughrue Mion, PLLC

(57) ABSTRACT

Tubes are connected to each other by a tube connecting part such that a distance between respective ends of the tubes is an optional distance or such that the ends of the tubes abut each other.

9 Claims, 5 Drawing Sheets

(56) References Cited

U.S. PATENT DOCUMENTS

| | | | | |
|---|---|---|---|---|
| 2010/0270075 | A1* | 10/2010 | Murayama | B60R 16/0207 174/72 A |
| 2011/0067920 | A1* | 3/2011 | Toyama | B60R 16/0207 174/72 A |
| 2011/0088944 | A1 | 4/2011 | Ogue et al. | |
| 2012/0261184 | A1* | 10/2012 | Kitamura | B60R 16/0215 174/72 A |

FOREIGN PATENT DOCUMENTS

| | | |
|---|---|---|
| EP | 1465309 A2 | 10/2004 |
| EP | 1565973 B1 | 4/2007 |
| JP | 2007-66825 A | 3/2007 |
| JP | 2009-143326 A | 7/2009 |
| JP | 2010-012868 A | 1/2010 |
| JP | 2011-072079 A | 4/2011 |

OTHER PUBLICATIONS

Written Opinion dated Sep. 17, 2013 issued by the International Searching Authority in counterpart International Patent Application No. PCT/JP2013/070658 (PCT/ISA/237).

Communication issued Mar. 24, 2016, issued by the European Patent Office in counterpart European Patent Application No. 13825248.1.

Communication dated Jun. 2, 2016, from the State Intellectual Property Office of People's Republic of China in counterpart Application No. 201380041145.X.

Communication mailed on Jun. 21, 2016, from the Japanese Patent Office in counterpart application No. 2012-170834.

Office Action issued on Jan. 4, 2017 issued by the State Intellectual Property Office of P.R. China in counterpart Chinese Application No. 201380041145.X.

Communication issued Feb. 1, 2017, issued by the European Patent Office in counterpart European Patent Application No. 13825248.1.

* cited by examiner

WIRE HARNESS EXTERIOR MEMBER AND WIRE HARNESS

CROSS REFERENCE TO RELATED APPLICATIONS

This application is a continuation of International Patent Application No. PCT/JP2013/070658 filed on Jul. 30, 2013, claiming priority from Japanese Patent Application No. 2012-170834 filed on Aug. 1, 2012, the contents of which are incorporated herein by reference.

FIELD OF INVENTION

The present invention relates to a wire harness exterior member and a wire harness including this exterior member.

BACKGROUND ART

High-voltage (i.e., for high voltage) wire harnesses are used as components for electrical connection between, for example, a battery and an inverter unit of a hybrid car or an electric car. Some wire harnesses for the electrical connection between the battery and the inverter unit include a plurality of high-voltage conducting paths and an exterior member for protecting these conducting paths (see Patent Document 1 identified below).

Patent Document 1: JP 2010-12868 A

A wire harness disclosed in Patent Document 1 uses a resin member as an exterior member. With respect to a resin exterior member, the inventors have been considering use of an exterior member having a flexible tube portion formed as a flexible portion and an inflexible tube portion formed as an inflexible portion and continuing from the flexible tube portion. In this exterior member, however, in the case where the flexible tube portion is molded to have a length larger than a desired length, the exterior member may be bent at a position different from a desired bending position. Besides, in the case where the flexible tube portion is molded to have a length larger than a desired length, if the exterior member has a prescribed total length, the length of the inflexible tube portion becomes smaller correspondingly to the larger length of the flexible tube portion. Therefore, the inflexible tube portion cannot be used in a state where it is long, namely, with its desired length.

In addition, since the exterior member is produced by using a resin molding die, in the case where a plurality of types of exterior members are to be prepared in accordance with, for example, the type of vehicle, there is a possibility that a resin molding die should be prepared for every type of vehicle.

The present invention has been made in view of the above circumstances, and it is an object thereof to provide a wire harness exterior member and a wire harness in which the influence of dimensional variation can be reduced and versatility can be improved.

SUMMARY OF INVENTION

To solve the problem described above, a wire harness exterior member and a wire harness according to the present invention have the following features (1) to (6).

(1) A wire harness exterior member including at least two types of tubes, and a tube connecting part connecting different types of tubes to each other, in which the tubes are connected to each other by the tube connecting part such that a distance between respective ends of the tubes is an optional distance or such that the ends of the tubes abut each other.

(2) The wire harness exterior member according to (1) described above, in which the tubes include a flexible tube formed as a flexible portion and an inflexible tube formed as an inflexible portion.

(3) The wire harness exterior member according to (2) described above, in which the flexible tube has a shape of a corrugated tube.

(4) The wire harness exterior member according to any one of (1) to (3) described above, in which the tube connecting part includes a waterproof structure.

(5) The wire harness exterior member according to any one of (1) to (4) described above, in which the tube connecting part is a post-attached part having at least one function other than a function to connect the tubes to each other.

(6) A wire harness, including the wire harness exterior member according to any one of (1) to (5) described above; and a conducting path covered by the wire harness exterior member.

According to the wire harness exterior member of (1) described above, since the tubes can be connected to each other by the tube connecting part with the end-to-end distance between the tubes being reduced or increased, the influence of dimensional variation can be suppressed. In addition, according to the wire harness exterior member of (1) described above, in the case where a tube is molded to have a length larger than a desired length, after processing the end of the tube correspondingly to the dimensional variation to shorten the tube to the desired length, the tube can be connected to another tube with their ends placed in a butting state. Such processing can be performed because the end of a tube can be removed.

Besides, according to the wire harness exterior member of (1) described above, if tubes with a standard length are prepared, the tubes with the standard length are respectively cut into prescribed lengths for length adjustment, and the tubes thus adjusted in their lengths are connected by using the tube connecting part, a wire harness exterior member with a length according to every type of vehicle can be obtained without preparing a resin molding die for every type of vehicle. In other words, the versatility of the wire harness exterior member can be improved.

Furthermore, according to the wire harness exterior member of (1) described above, since a plurality of types of tubes are connected to each other by the tube connecting part, the wire harness exterior member can be assembled when needed (i.e., in a timely manner). Therefore, the production of the wire harness can be performed in the vicinity of a location for routing the wire harness. For example, a plurality of types of tubes and a necessary number of tube connecting parts are shipped in the form of parts in a space-saving manner to a vicinity of a location for arranging the wire harness. Then, immediately after the shipping, tubes selected from the plurality of types of tubes are attached to at least one conducting path, and the tubes are connected to each other by the tube connecting part, and thus, the production of the wire harness can be completed. In this manner, according to the wire harness exterior member of (1) described above, the transportation efficiency and production efficiency of the wire harness can be improved.

According to the wire harness exterior member of (2) described above, since the tubes include at least two types of tubes, that is, the flexible tube and the inflexible tube, the exterior member can be bent at a desired position, or a region where it is difficult to bend can be secured.

According to the wire harness exterior member of (3) described above, since the flexible tube is formed to have a shape of a corrugated tube, the wire harness exterior member including the flexible tube with a easily bendable structure can be provided.

According to the wire harness exterior member of (4) described above, since the tube connecting part includes the waterproof structure, a water content can be prevented from entering the tubes.

According to the wire harness exterior member of (5) described above, since the tube connecting part has another function apart from the function to connect the tubes to each other, the number of parts can be reduced as compared with the case where another part is used for providing this another function.

According to the wire harness of (6) described above, since the wire harness exterior member of any one of (1) to (5) described above is included, even if there is dimensional variation, the influence of the variation can be reduced. Besides, according to the wire harness of (6) described above, since the wire harness exterior member of any one of (1) to (5) described above is included, the versatility can be improved, which can contribute to the cost reduction of the wire harness.

EMBODIMENTS OF INVENTION

A wire harness according to the present embodiment includes at least one conducting path and a wire harness exterior member covering the conducting path. This wire harness exterior member includes at least two types of tubes and a tube connecting part connecting different types of tubes to each other. The tube connecting part connects the tubes to each other such that a distance between respective ends of the tubes is an optional distance or such that the ends of the tubes abut each other. The influence of dimensional variation occurring in molding the tubes can be reduced by, for example, connecting the tubes by using the tube connecting part with the end-to-end distance between the tubes increased or decreased.

Figure 1:
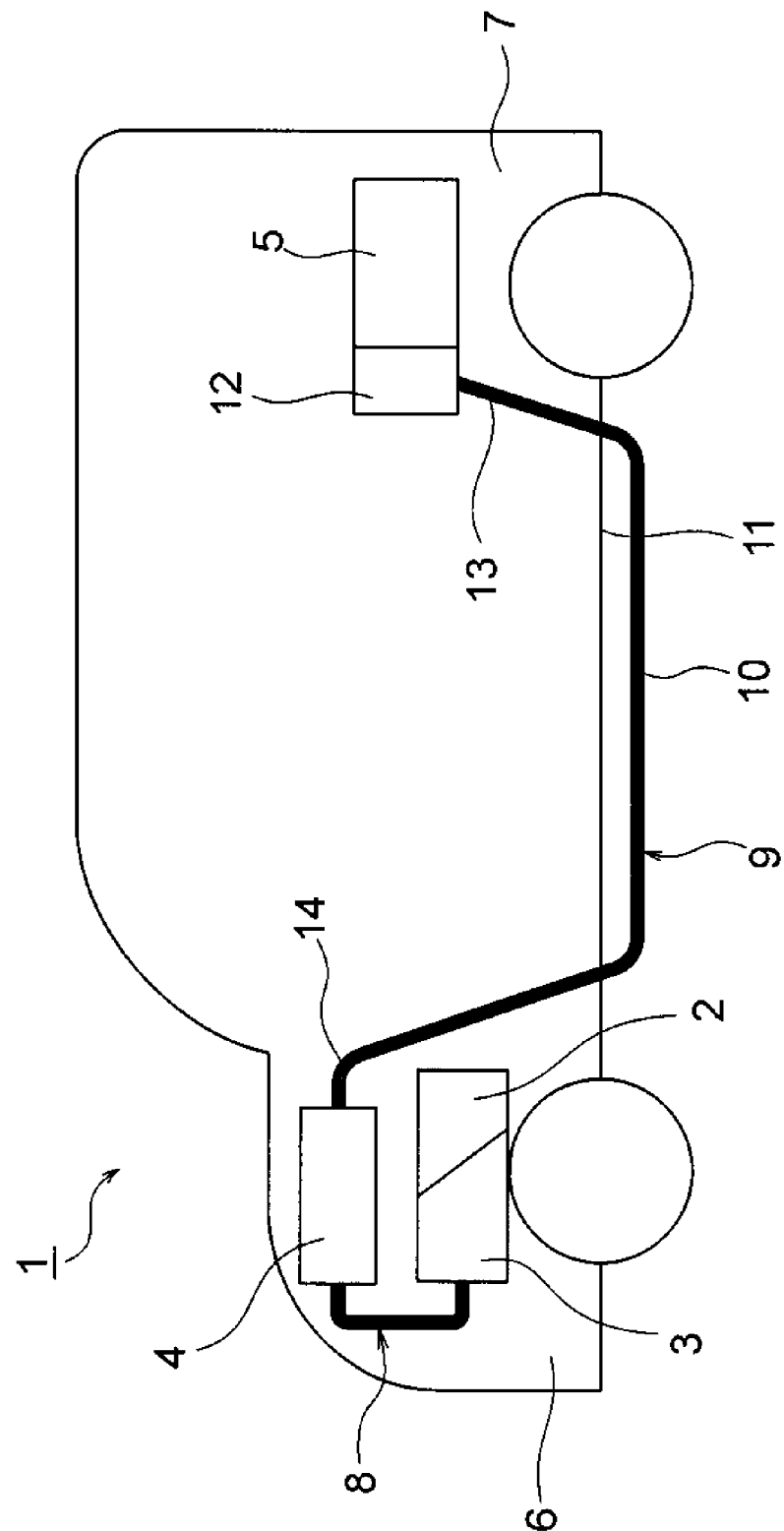
FIG. 1 is a schematic view illustrating an arrangement of a wire harness.
Figure 2:
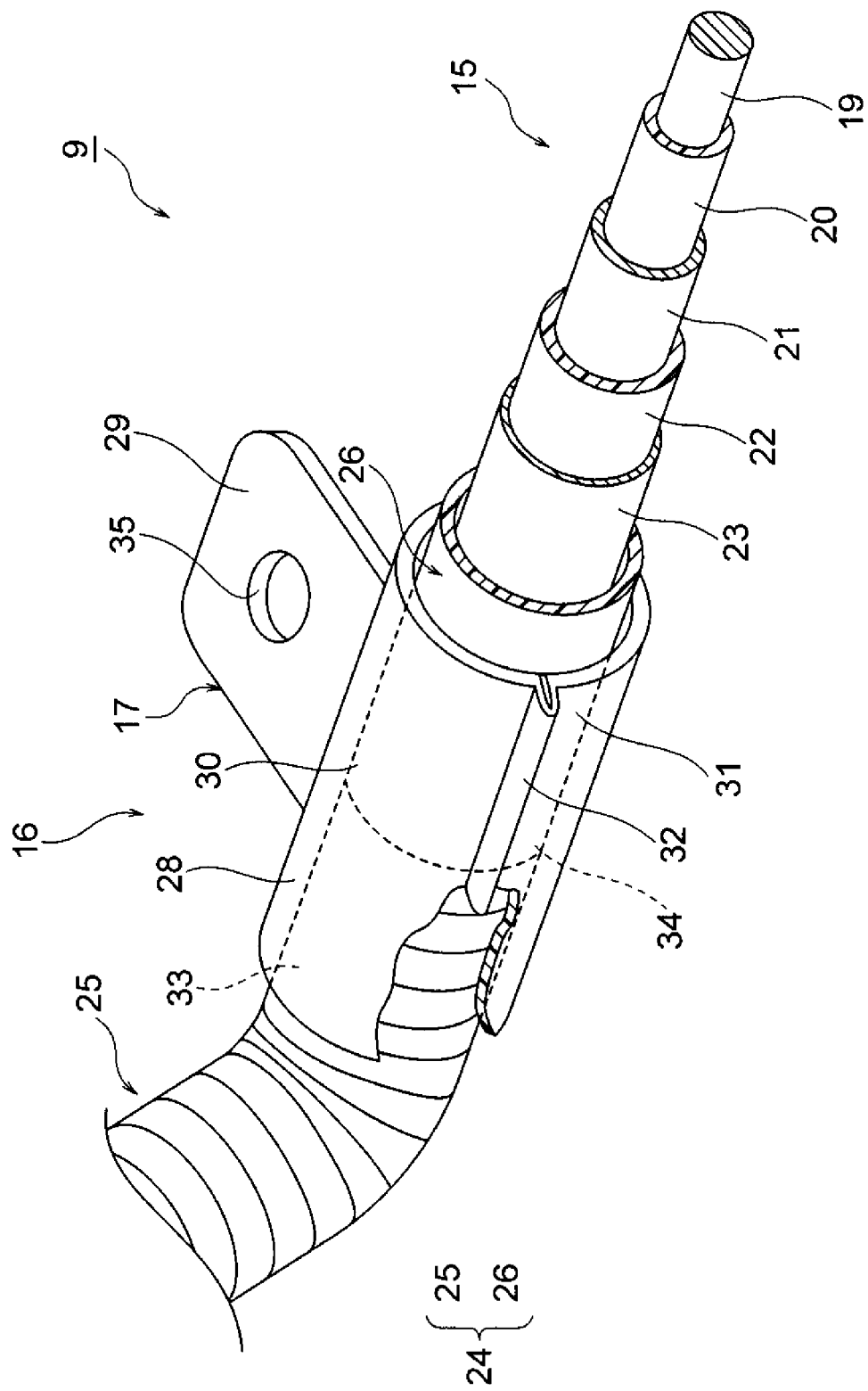
FIG. 2 is a diagram illustrating a configuration of the wire harness.
Figure 3:
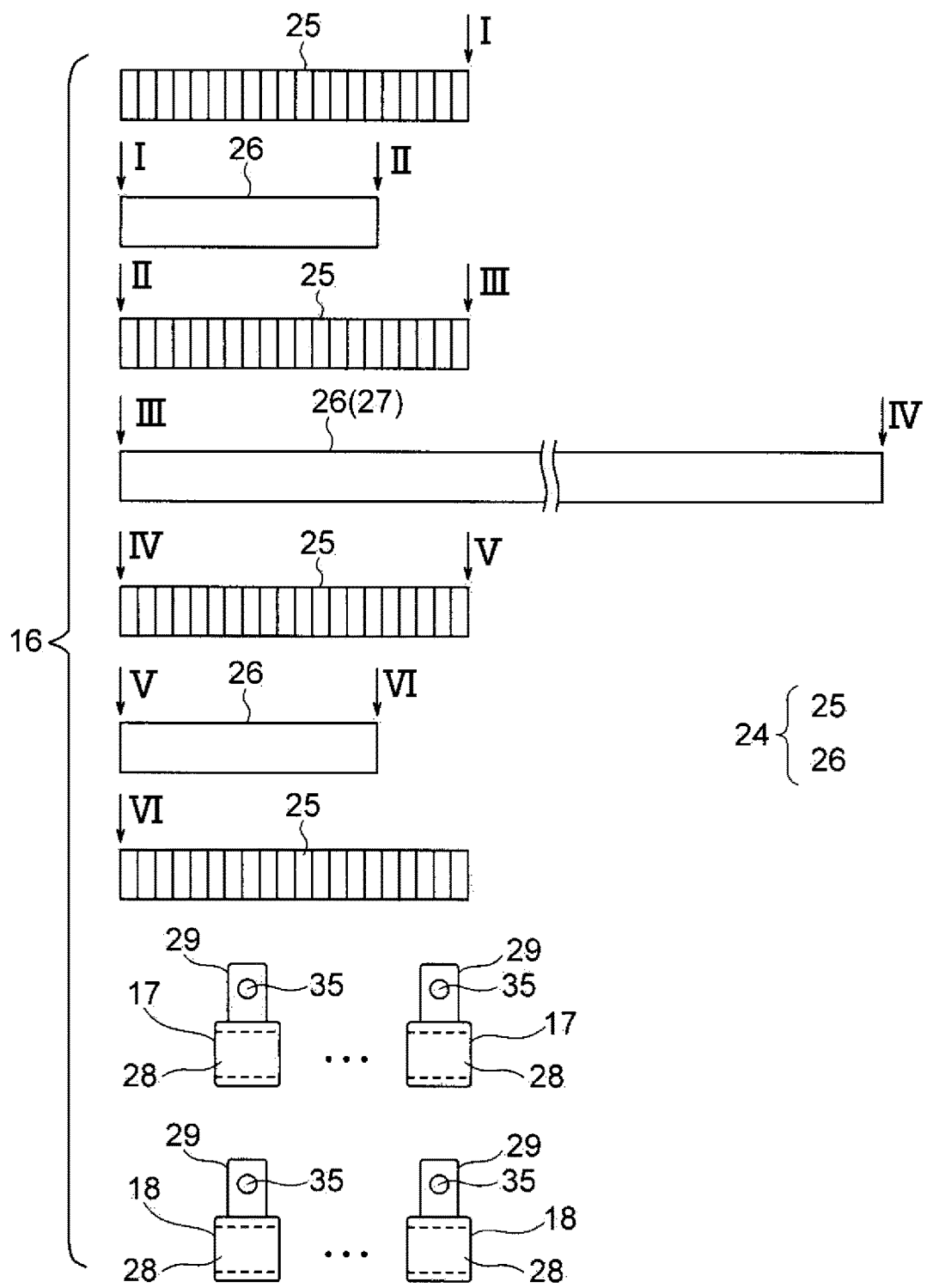
FIG. 3 is a diagram illustrating a configuration of an exterior member.

An embodiment of a wire harness and a wire harness exterior member (an exterior member 16) of the present invention will now be described with reference to FIGS. 1 to 5. FIG. 1 is a schematic view illustrating an arrangement of the wire harness. FIG. 2 is a diagram illustrating a configuration of the wire harness, FIG. 3 is a diagram illustrating a configuration of the exterior member, FIGS. 4A to 4D are diagrams illustrating a connection of tubes, and FIG. 5 is a diagram illustrating a fixed state of the wire harness.

In the present embodiment, description will be given on the assumption that the wire harness of the present embodiment is arranged in a hybrid car (which may be an electric vehicle or a general vehicle).

In FIG. 1, a reference numeral 1 denotes a hybrid car. The hybrid car 1 is a vehicle driven by mixedly using two powers of an engine 2 and a motor unit 3. To the motor unit 3, an electric power from a battery 5 (in other words, a battery pack) is supplied via an inverter unit 4. In the present embodiment, the engine 2, the motor unit 3 and the inverter unit 4 are mounted in an engine room 6 positioned in the vicinity of the front wheels and the like. The battery 5 is mounted in a vehicle rear portion 7 in the vicinity of the rear wheels and the like. The battery 5 may be mounted in a vehicle cabin provided behind the engine room 6.

The motor unit 3 and the inverter unit 4 are electrically connected to each other via a high-voltage wire harness 8. The battery 5 and the inverter unit 4 are also electrically connected to each other via a high-voltage wire harness 9. The wire harness 9 includes a intermediate portion 10 arranged in a vehicle underfloor portion 11. The wire harness 9 is arranged substantially parallel along the vehicle underfloor portion 11. The vehicle underfloor portion 11 is a known body and is what is called a panel member, and has a through hole (not shown) formed in a prescribed position. The wire harness 9 is inserted through this through hole.

The wire harness 9 is electrically connected to the battery 5 via a junction block 12 provided on the battery 5. A rear end portion 13 of the wire harness 9 is electrically connected to the junction block 12 by a known method. A front end portion 14 of the wire harness 9 is electrically connected to the inverter unit 4 by a known method.

The motor unit 3 includes a motor (not shown) and a generator (not shown). The inverter unit 4 includes an inverter (not shown) and a converter (not shown). The motor unit 3 is formed as a motor assembly including a shield case (not shown). The inverter unit 4 is also formed as an inverter assembly including a shield case (not shown). The battery 5 is a Ni-MH or Li-ion battery, and is formed as a module. It is noted that a power storage device such as a capacitor can be used. The battery 5 is not especially limited as long as it can be used in the hybrid car 1 or an electric vehicle.

First, the configuration and the structure of the wire harness 9 will be described. The wire harness 9 is a member for high voltage to electrically connect the inverter unit 4 and the battery 5 to each other as described above, and includes a high-voltage coaxial composite conducting path 15 (namely, a conducting path) and an exterior member 16 (namely, a wire harness exterior member) as illustrated in FIG. 2. The wire harness 9 is fixed on the vehicle underfloor portion 11 or the like via a clamp 17 or 18 attached to the exterior member 16 described later. It is noted that the term "high-voltage" means for use with high voltage.

The high-voltage coaxial composite conducting path 15 includes a plus circuit and a minus circuit by itself. In other words, the high-voltage coaxial composite conducting path 15 is configured to include circuits of two systems. Specifically, the high-voltage coaxial composite conducting path 15 includes a first conducting path 19 positioned in the center of the high-voltage coaxial composite conducting path 15 and having a circular cross-section, and a first insulator 20 covering the outer circumference of the first conducting path 19 and having a prescribed thickness. The high-voltage coaxial composite conducting path 15 includes a second conducting path 21 provided outside the first insulator 20, and a second insulator 22 covering the outer circumference of the second conducting path 21 and having a prescribed thickness. The high-voltage coaxial composite conducting path 15 further includes a cylindrical electromagnetic shielding member 23 tightly adhering to the outer surface of the second insulator 22. It is noted that the high-voltage coaxial composite conducting path 15 may further include a sheath covering the outer circumference of the electromagnetic shielding member 23 and having a prescribed thickness.

The electromagnetic shielding member 23 is made of known braid, metal foil or the like, and apart from the arrangement in the above-described configuration of the high-voltage coaxial composite conducting path 15, it may be provided as follows: It may be provided on the second insulator 22 rather loosely.

The electromagnetic shielding member 23 may be formed into a cylindrical shape to be tightly adhered to the outer surface of the second insulator 22, or may be formed into a tape or sheet shape to be tightly wound around the second insulator 22.

The conducting path may be, other than the high-voltage coaxial composite conducting path 15 described above, a known high-voltage electric wire including a conductor and an insulator, a shielded wire, a cabtire cable, a bus bar provided with an insulator. The number of the conducting paths may be one or more.

The high-voltage coaxial composite conducting path 15 includes two systems in the present embodiment, but the number of systems is not limited to two but it may include three or more systems up to n systems. Specifically, when the number of circuits is increased outward so as to attain a coaxial and single wire configuration, n systems can be attained.

In FIGS. 2 and 3, the exterior member 16 (the wire harness exterior member) includes a plurality of types (two types in the present embodiment) of tubes 24 for housing and protecting the high-voltage coaxial composite conducting path 15 and a plurality of types (two types in the present embodiment) of clamps 17 and 18. The tubes 24 include two types of tubes, that is, a plurality of flexible tubes 25 and a plurality of inflexible tubes 26, in the present embodiment. Each tube 24 may be made of either a resin or a metal. In the present embodiment, a resin (resin-molded) tube is employed.

The clamp 17 (a tube connecting part) works as a tube connecting part for connecting tubes 24 to each other as well as a fixing part for holding and fixing the tubes 24 on the vehicle underfloor portion 11 (see FIG. 1) or the like. Thus, the clamp 17 has at least two functions. On the other hand, the clamp 18 also works as a fixing part for holding and fixing the tubes 24 on the vehicle underfloor portion (see FIG. 1), but this is the only function thereof (although the number of functions is herein described merely as an example). As the clamp 18, a known clamp is used.

The clamps 17 and 18 are parts attached to the tubes 24 afterward in the production of the wire harness 9, in other words, are post-attached parts.

The flexible tube 25 is molded to be in a straight state. The flexible tube 25 has flexibility and restorability. In the present embodiment, the flexible tube 25 is formed to have a circular cross-section. The flexible tube 25 is formed to have a shape of a corrugated tube having, continuously along the lengthwise direction thereof, a plurality of depressions and projections formed around the circumferential direction of the outer surface thereof (the cross-sectional shape of the flexible tube 25 is not limited to a circle but may be an ellipse, an oblong, a rectangle or the like.) Specifically, the flexible tube 25 is formed similarly to a known corrugated tube. Incidentally, the shape of the flexible tube 25 is not especially limited as long as it is formed as a flexible portion. The flexible tube 25 is formed to have a prescribed length as its total length.

The inflexible tube 26 is formed as a portion that is not bent. A portion that is not bent means a portion not positively provided with flexibility. The inflexible tube 26 is formed to have a prescribed length as its total length. The inflexible tube 26 is formed into a straight tube shape having a circular cross-section. The shape of the inflexible tube 26 is not limited to the shape having a circular cross-section but its cross-section may be in a shape of an ellipse, an oblong, a rectangle or the like. Since the inflexible tube 26 is in a straight tube shape, it can be regarded as a "straight tube portion" or a "straight portion".

The inflexible tube 26 is formed to have a small thickness to attain the minimum necessary strength. The inflexible tube 26 may be provided with, if necessary, a portion for improving a heat dissipation property and rigidity, a portion for securing the resistance to chipping, or the like.

Each of the flexible tube 25 and the inflexible tube 26 described so far is formed in a shape provided with no slit (namely, no cut) along its axial direction. A reason why no slit is provided is for improving the rigidity and strength. Another reason is for preventing invasion of a water content to improve the water resistance. Still another reason is for preventing the high-voltage coaxial composite conducting path 15 from sticking out through, for example, a bent portion.

The exterior member 16 includes, in the tube 24, a portion in a shape similar to a corrugated tube as described above, and hence can be regarded as a "corrugated tube" or a "partially formed corrugated tube".

The exterior member 16 includes, as the inflexible tube 26, an underfloor inflexible tube 27 arranged in the vehicle underfloor portion 11 (see FIGS. 1 and 5). Since the underfloor inflexible tube 27 is arranged in the vehicle underfloor portion 11 (for example, arranged along a lean hose), it is formed in a long shape.

The clamp 17 is a tube connecting part as described above and can connect the flexible tube 25 and the inflexible tube 26 to each other. Specifically, it can connect ends I to VI (see FIG. 3) of the flexible tube 25 and the inflexible tube 26. In other words, the ends I, the ends II, . . . or the ends VI are mutually connected. The clamp 17 is used for the fixation on the vehicle underfloor portion 11 (see FIG. 1) or the like.

The clamp 17 includes a rigid attaching portion 28 formed in accordance with the outer shape of the tube 24, and a fixing portion 29 in a cantilever shape continued from the rigid attaching portion 28. The rigid attaching portion 28 includes tube attachments 30 and 31 in a half-split shape, and a hinge 32 connecting these tube attachments 30 and 31 to each other (see FIG. 2). The rigid attaching portion 28 has rigidity and is formed as a portion difficult to bend. The tube attachments 30 and 31 have fitting portions not shown for fitting them to each other.

In FIGS. 4A to 4D, on the inner surface of the rigid attaching portion 28, a flexible tube engaging portion 33 working as a portion for engaging with the flexible tube 25 is provided in one end region, and an inflexible tube engaging portion 34 working as a portion for engaging with the inflexible tube 26 is provided in the other end region. Incidentally, in the present embodiment, although not illustrated in the drawing, if the flexible tubes 25 are mutually connected, the flexible tube engaging portions 33 are provided in the both end regions, and if the inflexible tubes 26 are mutually connected, the inflexible tube engaging portions 34 are provided in the both end regions.

The flexible tube engaging portion 33 can prevent the flexible tube 25 from coming off and rotating and prevent a water content from entering. Similarly, the inflexible tube engaging portion 34 can prevent the inflexible tube 26 from coming off and rotating and prevent a water content from entering. The flexible tube engaging portion 33 and the inflexible tube engaging portion 34 may be identical to each other. The flexible tube engaging portion 33 and the inflexible tube engaging portion 34 correspond to a waterproof structure.

Here, states of the flexible tube 25 and the inflexible tube 26 connected to each other by the clamp 17 will be described with reference to FIGS. 4A to 4D.

Figure 4A:
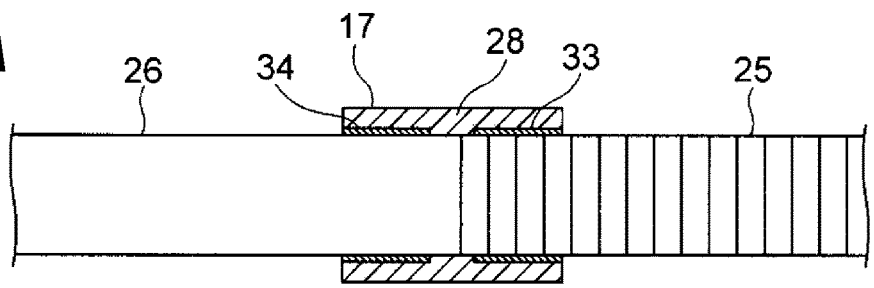
FIGS. 4A to 4D are diagrams illustrating a connection of tubes.
Figure 5:
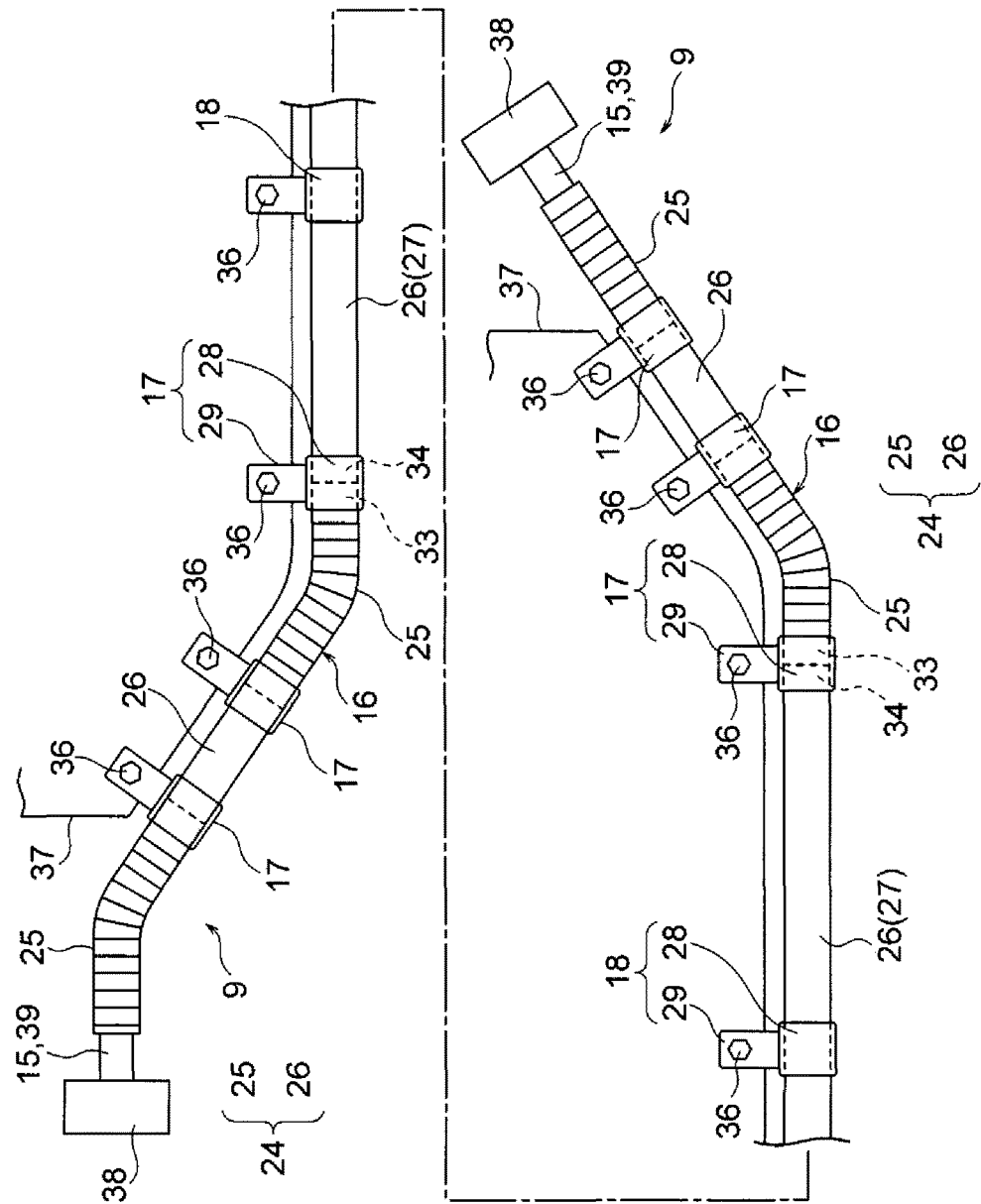
FIG. 5 is a diagram illustrating a fixed state of the wire harness.

In FIG. 4A, the flexible tube 25 and the inflexible tube 26 are connected to each other so that the ends thereof can be in a butting state. Thus, each of the flexible tube 25 and the inflexible tube 26 has a prescribed length as its total length. Alternatively, after processing the end of each of the flexible tube 25 and the inflexible tube 26 to attain a prescribed length after the connection, they are connected to each other with their ends placed in a butting state.

Figure 4B:
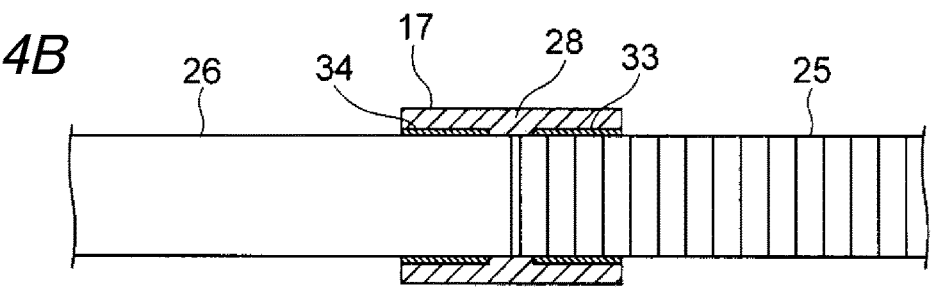

In FIG. 4B, if there is slight dimensional variation in the total length of the flexible tube 25 and the inflexible tube 26, the flexible tube 25 and the inflexible tube 26 are connected to each other with a distance between the ends thereof, namely, an end-to-end distance therebetween, being provided correspondingly to the dimensional variation. Specifically, the flexible tube 25 and the inflexible tube 26 are connected to each other such that the end-to-end distance between these tubes can be a given distance specified on the basis of the dimensional variation.

Figure 4C:
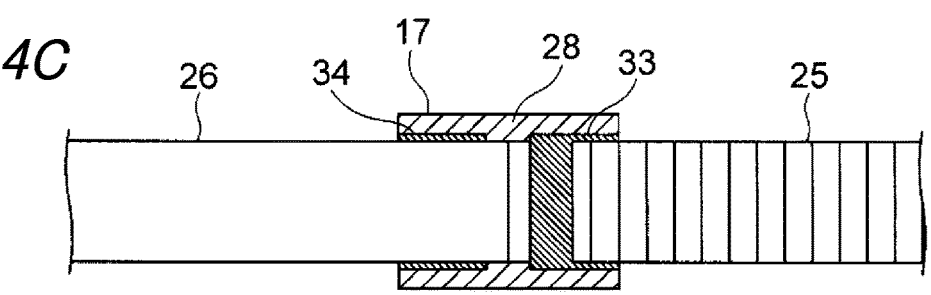

In FIG. 4C, if the flexible tube 25 is molded to have a slightly small total length, the flexible tube 25 is disposed with its end shifted to be closer to the end of the rigid attaching portion 28 correspondingly to the dimensional variation. The flexible tube 25 and the inflexible tube 26 are connected to each other with the end-to-end distance therebetween being provided correspondingly to the dimensional variation.

Figure 4D:
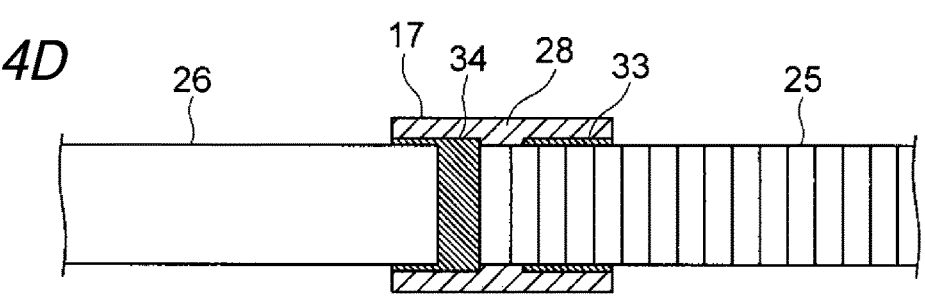

In FIG. 4D, if the inflexible tube 26 is molded to have a slightly small total length, the inflexible tube 26 is disposed with its end shifted to be closer to the end of the rigid attaching portion 28 correspondingly to the dimensional variation. The flexible tube 25 and the inflexible tube 26 are connected to each other with the end-to-end distance therebetween being provided correspondingly to the dimensional variation.

In this manner, by changing the connecting positions of the flexible tube 25 and the inflexible tube 26 against the clamp 17 so as to set the end-to-end distance therebetween to a desired distance, or additionally by processing their ends, even if there is dimensional variation, the influence of the dimensional variation can be reduced.

In FIGS. 2, 3 and 5, the fixing portion 29 has a bolt insertion hole 35 formed therethrough. The wire harness 9 is fixed on a fixing counterpart 37 such as the vehicle underfloor portion 11 with a bolt 36 inserted through the bolt insertion hole 35 (although the shape of the fixing counterpart 37 is herein merely exemplarily illustrated). When the wire harness 9 is fixed on the fixing counterpart 37, the routing is completed as illustrated in FIG. 5.

In FIGS. 5 and 3, the clamp 18 is configured to be fixed on the vehicle underfloor portion 11 (see FIG. 1) or the like. The clamp 18 includes a rigid attaching portion 28 formed in accordance with the outer shape of the tube 24, and a fixing portion 29 in a cantilever shape continued from the rigid attaching portion 28. In the present embodiment, the clamp 18 is attached to the underfloor inflexible tube 27 alone (which is described herein merely as an example).

The post-attached part may be a clip, a grommet, a protector or the like apart from the clamp 17. It goes without saying that such a post-attached part provided with a function to connect the tubes 24 as described above can be used as a replacement of the clamp 17.

In FIG. 5, the wire harness 9 is produced by inserting the high-voltage coaxial composite conducting path 15 into the flexible tube 25 and the inflexible tube 26, and then by attaching the clamp 17 so as to connect the flexible tube 25 and the inflexible tube 26 to each other. By attaching the clamp 18 to a prescribed position in the underfloor inflexible tube 27, the wire harness 9 is arranged in a prescribed position. Furthermore, the both ends of the wire harness 9 are respectively provided with known shield connectors 38.

One of the shield connectors 38 is an inverter-side shield connector, and the other of the shield connectors 38 is a battery-side shield connector. Each shield connector 38 is connected to an end 39 of the high-voltage coaxial composite conducting path 15 drawn out of the tube 24 (the flexible tube 25).

As described with reference to FIGS. 1 to 5, the wire harness 9 includes the high-voltage coaxial composite conducting path 15 and the exterior member 16 covering the high-voltage coaxial composite conducting path 15. The exterior member 16 includes a plurality of types of tubes 24 and the clamp 17 working as a tube connecting part for connecting the tubes 24 to each other. The clamp 17 connects the tubes 24 to each other with a desired end-to-end distance or with their ends abutting each other. Since the clamp 17 is such a part, the influence of dimensional variation can be reduced by connecting the tubes 24 to each other, for example, with the end-to-end distance therebetween reduced or increased.

Besides, according to the wire harness 9, for example, if tubes 24 with a standard length are prepared, the tubes 24 with the standard length are respectively cut into prescribed lengths for length adjustment, and the tubes 24 thus adjusted in their lengths are connected by using the clamp 17 working as the tube connecting part, a wire harness including an exterior member with a length according to every type of vehicle can be obtained without preparing a resin molding die for every type of vehicle, and thus, the versatility can be improved.

The wire harness and the wire harness exterior member of the present embodiment are summarized as follows:

(1) A wire harness exterior member (an exterior member 16) includes at least two types of tubes 24 (a flexible tube 25 and an inflexible tube 26) and a tube connecting part (a clamp 17) connecting different types of tubes to each other. The tubes 24 are connected to each other by the tube connecting part such that a distance between respective ends of the tubes 24 is an optional distance or such that the ends of the tubes 24 abut each other.

(2) In the wire harness exterior member (the exterior member 16), the tubes 24 include a flexible tube 25 formed as a flexible portion and an inflexible tube 26 formed as an inflexible portion.

(3) In the wire harness exterior member (the exterior member 16), the flexible tube 25 has a shape of a corrugated tube.

(4) In the wire harness exterior member (the exterior member 16), the tube connecting part includes a waterproof structure (a flexible tube engaging portion 33, an inflexible tube engaging portion 34).

(5) In the wire harness exterior member (the exterior member 16), the tube connecting part is a post-attached part having at least one function other than a function to connect the tubes 24 to each other.

(6) A wire harness 9 includes a wire harness exterior member (an exterior member 16) and a conducting path (a high-voltage coaxial composite conducting path 15) covered by the wire harness exterior member.

Of course, the present invention can be implemented with various changes without changing the gist of the present invention.

What is claimed is:

1. A wire harness exterior member comprising:
    at least two types of tubes, each having a desired length;
    a tube connecting part connecting the different types of tubes to each other,
    the tube connecting part comprising a cylindrical inner surface surrounding ends of the tubes,
    the cylindrical inner surface comprising an inwardly protruded portion at which at least one of the ends of the tubes is arranged; and
    a waterproof structure comprising
    a first tube engaging portion provided on one side of the inwardly protruded portion and engaging with one of the tubes that are connected to each other,
    and a second tube engaging portion provided on an opposite side of the inwardly protruded portion and engaging with the other of the tubes that are connected to each other,
    wherein the first tube engaging portion is provided to fill a space between the one of the tubes and the cylindrical inner surface of the tube connecting part,
    and the second tube engaging portion is provided to fill a space between the other of the tubes and the inner surface of the tube connecting part in a radial direction,
    such that the first tube engaging portion and the second tube engaging portion prevent the tubes from rotating and sliding,
    and such that the distance between the ends of the tubes corresponds to a variance between the length of the two tubes and the desired length of the two tubes.

2. The wire harness exterior member according to claim 1, wherein the tubes comprise a flexible tube formed as a flexible portion and an inflexible tube formed as an inflexible portion.

3. The wire harness exterior member according to claim 2, wherein the flexible tube has a shape of a corrugated tube.

4. The wire harness exterior member according to claim 1, wherein the tube connecting part is a post-attached part having at least one function other than a function to connect the tubes to each other.

5. The wire harness exterior member according to claim 4, wherein the tube connecting part comprises a fixing portion having a cantilever shape, the fixing portion being configured to hold the tubes that are connected to each other on a vehicle underfloor portion.

6. The wire harness exterior member according to claim 5, wherein the fixing portion comprises a bolt insertion hole.

7. The wire harness exterior member according to claim 1, wherein the tube connecting part comprises two tube attachments, each of the tube attachments having a semi-cylindrical inner surface.

8. The wire harness exterior member according to claim 7, wherein the tube connecting part further comprises a hinge connecting the tube attachments to each other.

9. A wire harness comprising:
    a wire harness exterior member;
    a conducting path covered by the wire harness exterior member,
    wherein the wire harness exterior member comprises:
    at least two types of tubes, each having a desired length;
    a tube connecting part connecting the different types of tubes to each other,
    the tube connecting part comprising a cylindrical inner surface surrounding ends of the tubes,
    the cylindrical inner surface comprising an inwardly protruded portion at which at least one of the ends of the tubes is arranged; and
    a waterproof structure comprising a first tube engaging portion provided on one side of the inwardly protruded portion and engaging with one of the tubes that are connected to each other,
    and a second tube engaging portion provided on an opposite side of the inwardly protruded portion and engaging with the other of the tubes that are connected to each other,
    wherein the first tube engaging portion is provided to fill a space between the one of the tubes and the cylindrical inner surface of the tube connecting part,
    and the second tube engaging portion is provided to fill a space between the other of the tubes and the cylindrical inner surface of the tube connecting part in a radial direction,
    such that the first tube engaging portion and the second tube engaging portion prevent the tubes from rotating and sliding,
    and such that the distance between the ends of the tubes corresponds to a variance between the length of the two tubes and the desired length of the two tubes.

* * * * *